(12) United States Patent
Schroeder

(10) Patent No.: US 7,097,139 B2
(45) Date of Patent: Aug. 29, 2006

(54) IN-FLIGHT REFUELING SYSTEM, DAMPING DEVICE AND METHOD FOR DAMPING OSCILLATIONS IN IN-FLIGHT REFUELING SYSTEM COMPONENTS

(75) Inventor: Steven B. Schroeder, Derby, KS (US)

(73) Assignee: The Boeing Company, Chicago, IL (US)

( * ) Notice: Subject to any disclaimer, the term of this patent is extended or adjusted under 35 U.S.C. 154(b) by 85 days.

(21) Appl. No.: 10/896,584

(22) Filed: Jul. 22, 2004

(65) Prior Publication Data

US 2006/0038076 A1 Feb. 23, 2006

(51) Int. Cl.
*B64D 39/00* (2006.01)
(52) U.S. Cl. .................................. 244/135 A
(58) Field of Classification Search ............ 244/135 A, 244/135 R
See application file for complete search history.

(56) References Cited

U.S. PATENT DOCUMENTS

| | | | | | |
|---|---|---|---|---|---|
| 2,793,828 | A | * | 5/1957 | Rohtert | 244/135 A |
| 2,949,265 | A | * | 8/1960 | Person | 244/135 A |
| 3,011,737 | A | * | 12/1961 | Morrow | 244/3 |
| 4,129,270 | A | * | 12/1978 | Robinson et al. | 244/135 A |
| 5,427,333 | A | * | 6/1995 | Kirkland | 244/135 A |
| 6,604,711 | B1 | * | 8/2003 | Stevens et al. | 244/135 A |

* cited by examiner

*Primary Examiner*—Tien Dinh
(74) *Attorney, Agent, or Firm*—Alston & Bird LLP

(57) ABSTRACT

An in-flight refueling system, damping device and method are provided for substantially reversing a change in the disposition of an elongate hose extending from a first aircraft during an in-flight refueling operation. The various embodiments of the present invention provide a compact, lightweight, and easily installed damping device that may act to minimize the occurrence of oscillations within the elongate hose that may act to produce a change in the disposition of the elongate hose. In addition, the embodiments of the present invention facilitate the detuning of the elongate hose and, for instance, an attached drogue that may oscillate uncontrollably at a resonant frequency in response to aerodynamic forces exerted on the hose and drogue during an in-flight refueling operation.

16 Claims, 6 Drawing Sheets

IN-FLIGHT REFUELING SYSTEM, DAMPING DEVICE AND METHOD FOR DAMPING OSCILLATIONS IN IN-FLIGHT REFUELING SYSTEM COMPONENTS

FIELD OF THE INVENTION

The present invention relates generally to in-flight refueling of a manned or unmanned aircraft using a probe and drogue in-flight refueling system, and specifically, providing a damping device for damping oscillatory motion in an elongate hose trailing from a first aircraft as part of an in-flight refueling operation. More particularly the present invention relates to the movement and deployment of a damping device along the elongate hose so as to reduce and/or minimize oscillations in the elongate hose.

BACKGROUND OF THE INVENTION

In-flight refueling (or air-to-air refueling) is an important method for extending the range of both manned and unmanned aircraft traveling long distances over areas having no feasible landing or refueling points. Although in-flight refueling is a relatively common operation, especially for military aircraft, the passage of large amounts of fuel between a first aircraft (the tanker aircraft, for instance) and a second aircraft (the receiver aircraft, for instance) during an in-flight refueling operation may create a potentially dangerous situation, especially if components of the in-flight refueling system are allowed to move or oscillate in an uncontrolled manner. In addition, the close proximity of the first aircraft and the second aircraft during an in-flight refueling operation may create the danger of a mid-air collision between the aircraft. Such a danger may be increased if a component of an in-flight refueling system extending from the first aircraft is allowed to oscillate or move in an erratic manner relative to the first aircraft.

One conventional system for in-flight refueling is the probe and drogue in-flight refueling system wherein the first aircraft may extend an elongate flexible hose having an end attached to a drogue such that the second aircraft, having a refueling probe extending therefrom, may engage the drogue while in flight in order to initiate the transfer of fuel. An operator of the second aircraft is responsible for maneuvering the second aircraft such that the refueling probe extending therefrom may enter and engage the drogue. According to some conventional probe and drogue in-flight refueling systems, the engagement of the refueling probe with the drogue is accomplished as the second aircraft carefully accelerates with respect to the trailing drogue. The drogue may include, for instance, a catch mechanism for securing the refueling probe within the drogue so that the refueling probe may be securely fastened within the drogue during the transfer of fuel.

The elongate hose extending from the first aircraft may trail directly aft and below a fuselage of the first aircraft, or, in some instances, it may trail directly aft and below a refueling pod that may be carried by the first aircraft on, for instance, a wing hardpoint. In both of these cases, the elongate hose may be exposed to high wind speeds as it is trailed behind the first aircraft. For instance, the first aircraft may travel at speeds between about 180 and 400 knots during a conventional in-flight refueling operation. During an in-flight refueling operation using a probe and drogue in-flight refueling system, the elongate hose may trail aft and below the first aircraft in a stable arc such that the drogue operably engaged with the end of the elongate hose may be held in a relatively stable position relative to the first aircraft. In such cases, an operator of the second aircraft may position the second aircraft such that a refueling probe extending therefrom may engage the relatively stable drogue.

As in all mechanical systems, however, the elongate hose and attached drogue may experience oscillatory vibrations in response to applied forces (such as for instance, wind). In some cases, the elongate hose (and attached drogue) may begin to oscillate uncontrollably (at for instance, a resonance frequency) with respect to the first aircraft such that the drogue may move in an erratic pattern with respect to the first aircraft such that it may become difficult for an operator of the second aircraft to maneuver the second aircraft such that the refueling probe extending therefrom may be engaged with the drogue. In such cases, the elongate hose, may, for instance, rise into an upward arc relative to the first aircraft and/or oscillate relative to the first aircraft. Such motion may not only make the in-flight refueling operation difficult but also endanger both the first and second aircraft if the motion becomes extreme. The safety of the crews that may operate the first and second aircraft may be in danger if the elongate hose and attached drogue begin to impact the control surfaces or other structural components of the first or second aircraft.

In such cases, conventional probe and drogue in-flight refueling systems may provide an elongate hose "take-up" system disposed, for instance, in the fuselage of the first aircraft, for stabilizing the hose with respect to the first aircraft. More particularly, the "take up" system may act to take up excess slack in the elongate hose in order to shorten the extension of the elongate hose in an attempt to dampen the oscillation of the elongate hose. If such a "take-up" system is used, however, the elongate hose may be drawn away from the second aircraft such that the in-flight refueling operation must be restarted wherein the first aircraft must re-extend the elongate hose and the second aircraft must re-position itself relative to the elongate hose and drogue attached to an end thereof. Additionally, simply taking up slack in the hose may not ensure that the oscillations in the elongate hose will not reappear when the elongate hose is re-extended. Additionally, suspending the in-flight refueling operation in order to retract and re-extend the elongate hose may be disadvantageous especially in cases wherein the second aircraft is carrying only a minimal amount of fuel and is therefore in need of an expeditious in-flight refueling contact.

Conventional probe and drogue in-flight refueling systems may also provide a guillotine system for cutting and jettisoning the elongate hose should oscillations or movement of the elongate hose and attached drogue become erratic enough so as to endanger the operators and/or other crew of either the first or second aircraft. However, it is undesirable to jettison the elongate hose and attached drogue as the first aircraft must cease in-flight refueling operations and return to an airfield for costly and complex repairs to the in-flight refueling system.

Thus, it would be advantageous to provide an alternative in-flight refueling system, damping device, and method for damping oscillations or changes in the disposition of the elongate hose and attached drogue that may occur during an in-flight refueling operation. In addition, it would be advantageous to provide a damping device that may ordinarily be transparent to operators of the first and second aircraft and that may interact with the elongate hose only when needed to dampen oscillations or reverse a change in disposition of the elongate hose. Also, it would be advantageous to provide a damping device that is simple, lightweight, and compact enough to be stored within existing in-flight refueling system pods or within a fuselage of the first aircraft without the need to modify existing in-flight refueling system components.

Therefore, there exists a need for an in-flight refueling system, damping device, and method for damping oscillations and preventing changes in disposition that may occur in probe and drogue in-flight refueling system components, such as for instance, an elongate hose trailing aft and below a first aircraft (serving as, for instance, a tanker aircraft). More particularly, there exists a need for a lightweight, compact, and easily installed damping device that may advance along a length of the elongate hose and deploy so as to reverse a change in the disposition of the elongate hose (such as an harmonic oscillation) by exerting lift and/or drag forces on the elongate hose so as to dampen oscillation or reverse the change in disposition.

SUMMARY OF THE INVENTION

The embodiments of the present invention satisfy the needs listed above and provide other advantages as described below. The in-flight refueling system, according to one embodiment, comprises: a tanker aircraft; an elongate hose having a first end carried by the tanker aircraft and an opposing second end configured to extend from the tanker aircraft; and a damping device engaged with the elongate hose and configured to advance along the elongate hose in response to a change in disposition (such as an upward movement) of the elongate hose. Furthermore, the damping device may be further configured to be deployed upon advancing along the elongate hose, such that the deployed damping device may be further configured to substantially reverse the change in disposition of the elongate hose. As such, the in-flight refueling system of the present invention may be configured to reduce oscillation or changes in the disposition of the elongate hose.

According to other embodiments, in-flight refueling system and damping device of the present invention may be further configured such that the deployed damping device may exert a lifting force and/or a drag force on the elongate hose. In some advantageous embodiments, the damping device may further comprise a roller bearing device operably engaged with the elongate hose and configured to advance along the elongate hose in response to a change in disposition of the elongate hose. Furthermore, the damping device may also comprise an airfoil device operably engaged with the roller bearing device configured to outwardly extend with respect to the elongate hose as the roller bearing device advances along the elongate hose. In other embodiments, the damping device may further comprise a gearing device disposed between the roller bearing device and the airfoil device wherein the gearing device is configured to outwardly extend the airfoil device with respect to the elongate hose as the roller bearing device advances toward the first end of the elongate hose.

The embodiments of the present invention also provide a method for facilitating the stabilization of an elongate hose having a first end carried by a tanker aircraft and an opposing second end configured to extend from the tanker aircraft. In some embodiments, the method may comprise the steps of: advancing a damping device along the elongate hose in response to a change in disposition of the elongate hose; and deploying the damping device upon advancing along the elongate hose so as to substantially reverse the change in disposition of the elongate hose. The method of the present invention may, in some embodiments, further comprise synchronizing the advancing and deploying steps such that the damping device is deployed in a linear relationship to the advance of the damping device along the elongate hose. According to some embodiments, the deploying step of the method of the present invention may further comprise outwardly extending the damping device with respect to the elongate hose as the damping device advances along the elongate hose so as to exert a lift and/or drag force on the elongate hose.

Thus the various embodiments of the in-flight refueling system, damping device, and method of the present invention provide many advantages that may include, but are not limited to: providing an in-flight refueling system that may be responsive to a change in disposition of an end of the elongate hose trailing from a first aircraft during an in-flight refueling operation so as to reverse the change in disposition without the need to retract the elongate hose into a pod or a fuselage of the first aircraft, providing a lift or drag force on the elongate hose so as to detune the elongate hose and attached drogue from a resonant oscillation that may occur due to wind forces or other aerodynamic forces exerted on the elongate hose and drogue, and providing a damping device capable of advancing along the elongate hose so as to reverse changes in the disposition of the elongate hose wherein the damping device is compact, lightweight, and capable of being easily stored in existing in-flight refueling system pods or in a fuselage of the first aircraft.

These advantages and others that will be evident to those skilled in the art are provided in the in-flight refueling system, damping device, and method of the present invention.

BRIEF DESCRIPTION OF THE DRAWINGS

Figure 1:
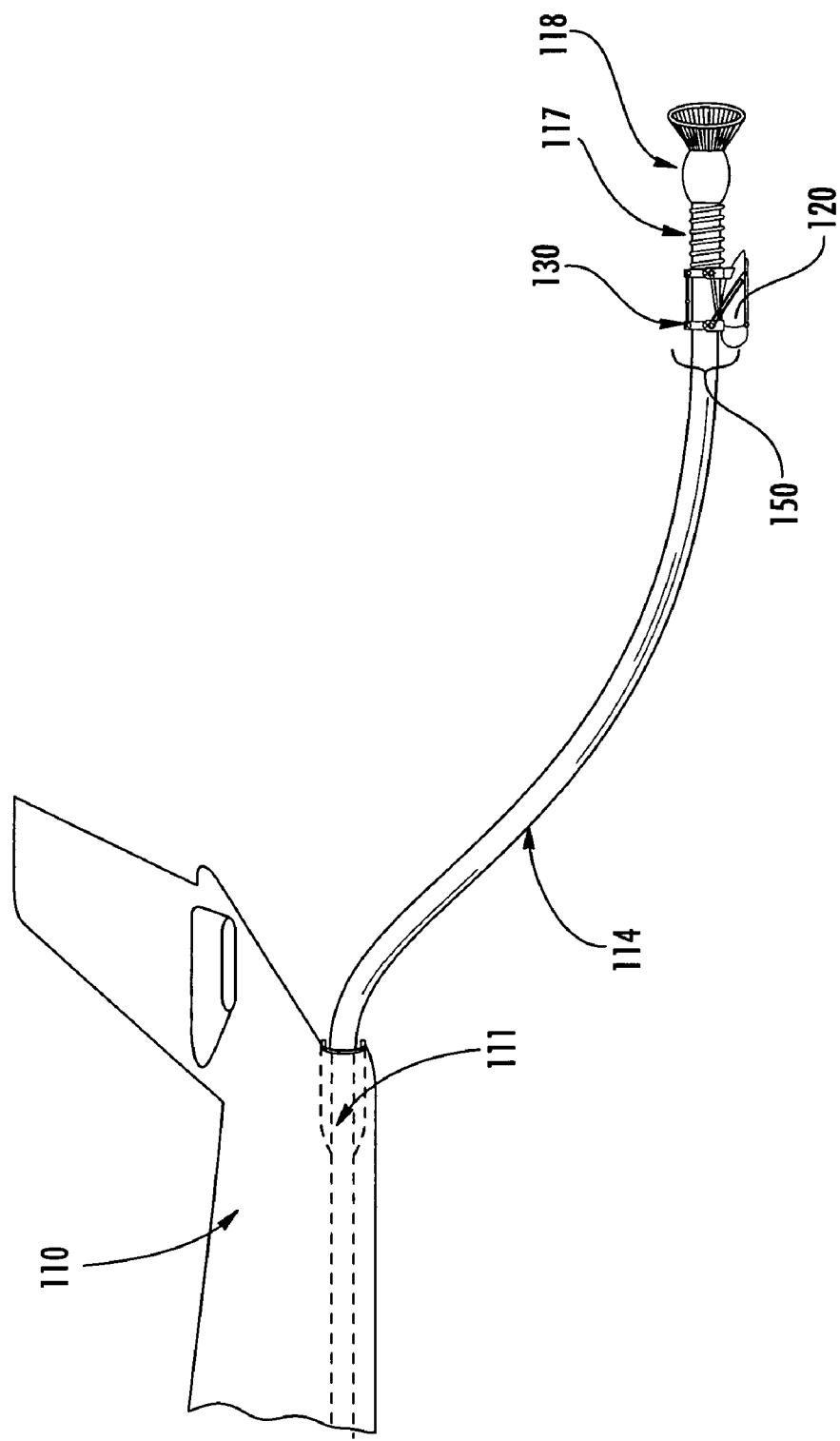
Figure 2:
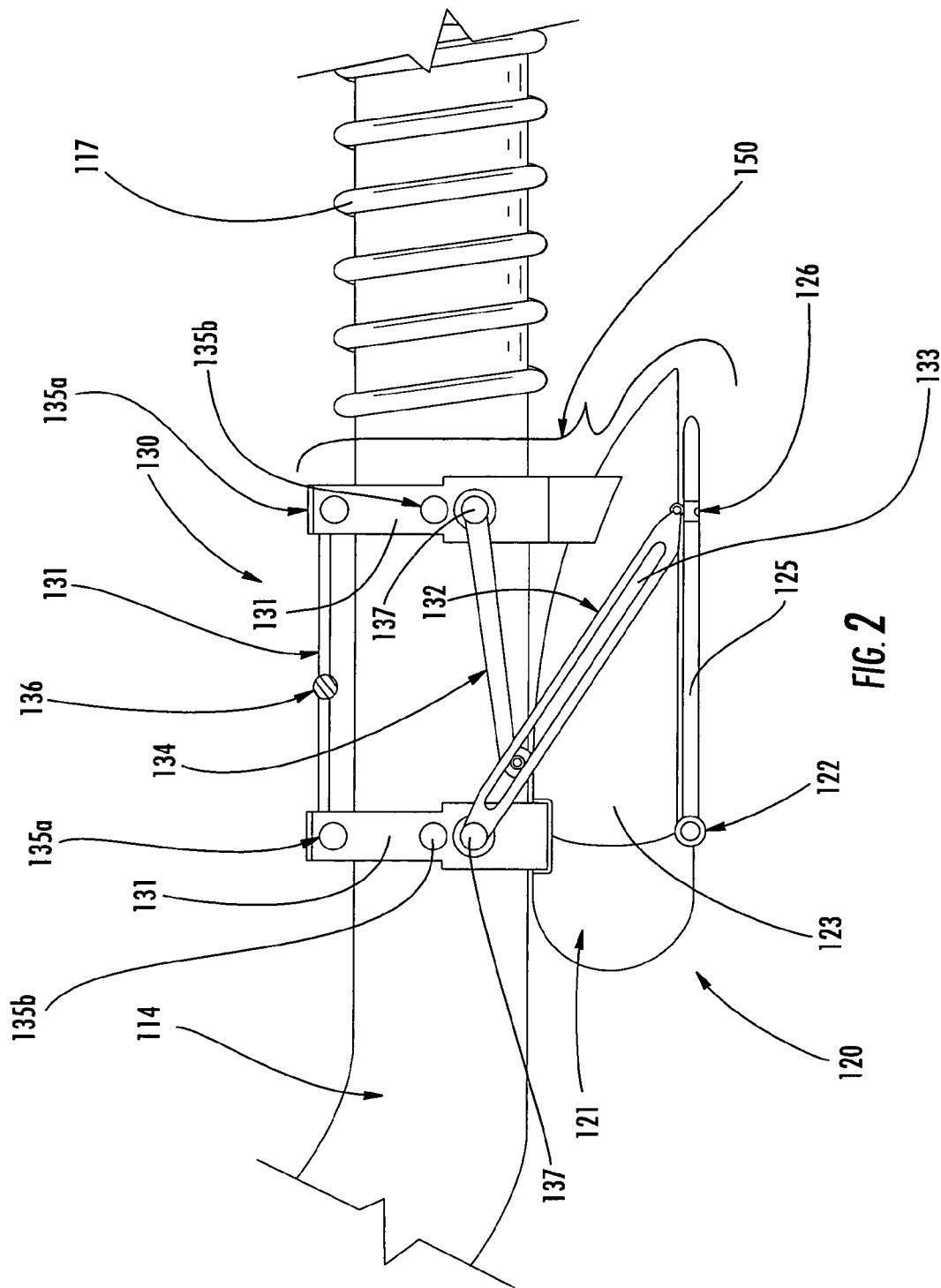
Figure 3:
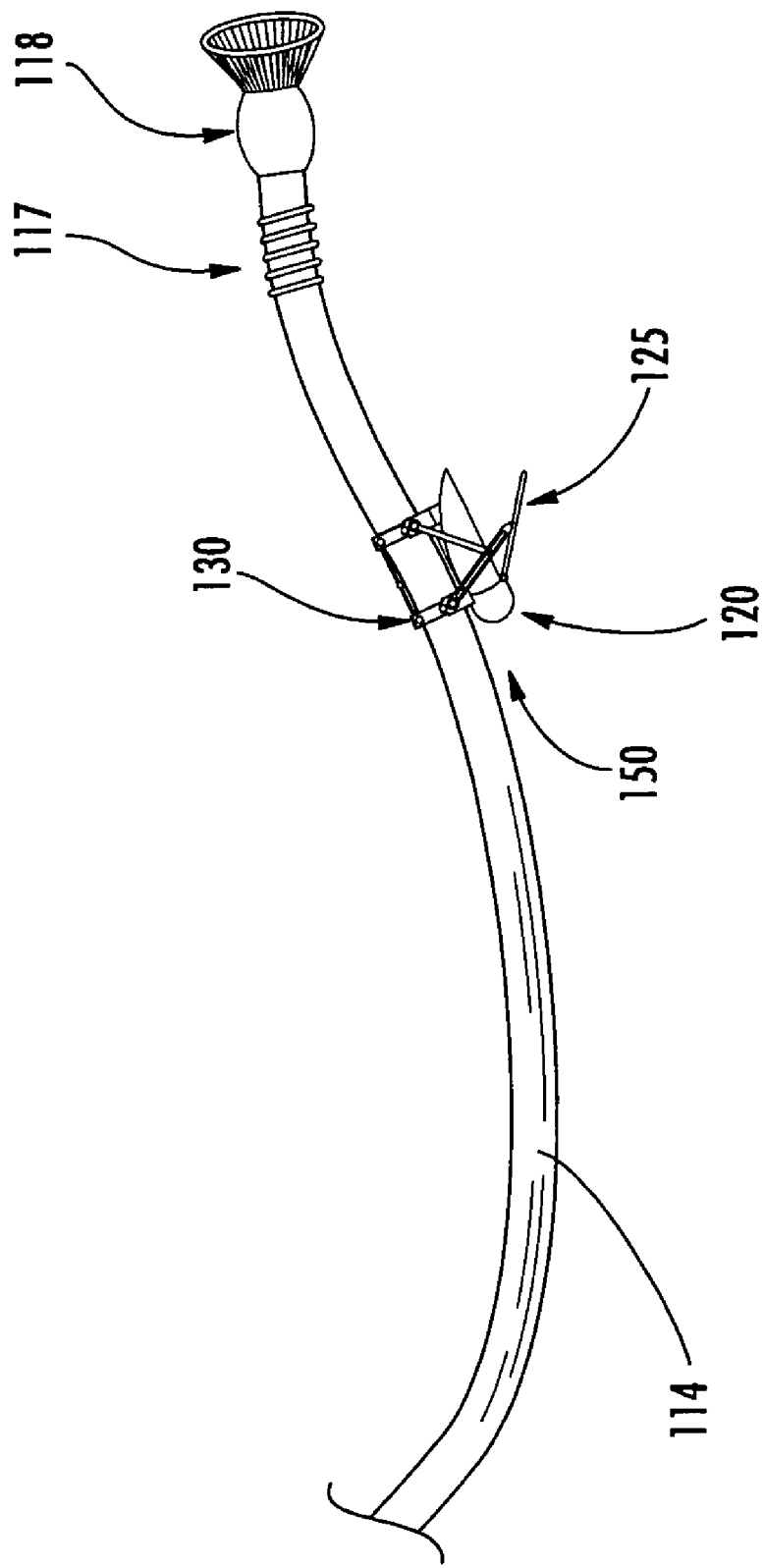
Figure 4:
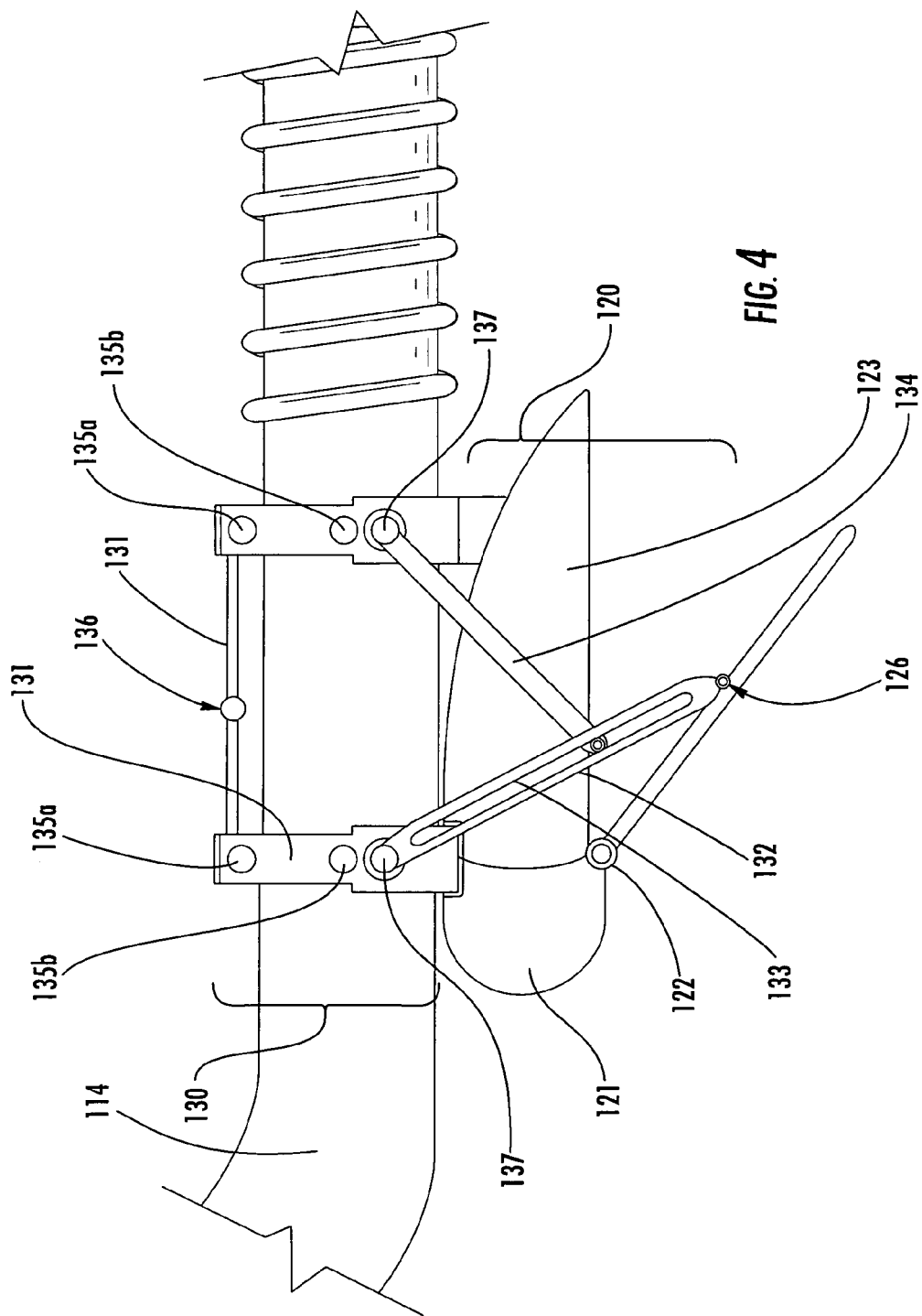
Figure 5:
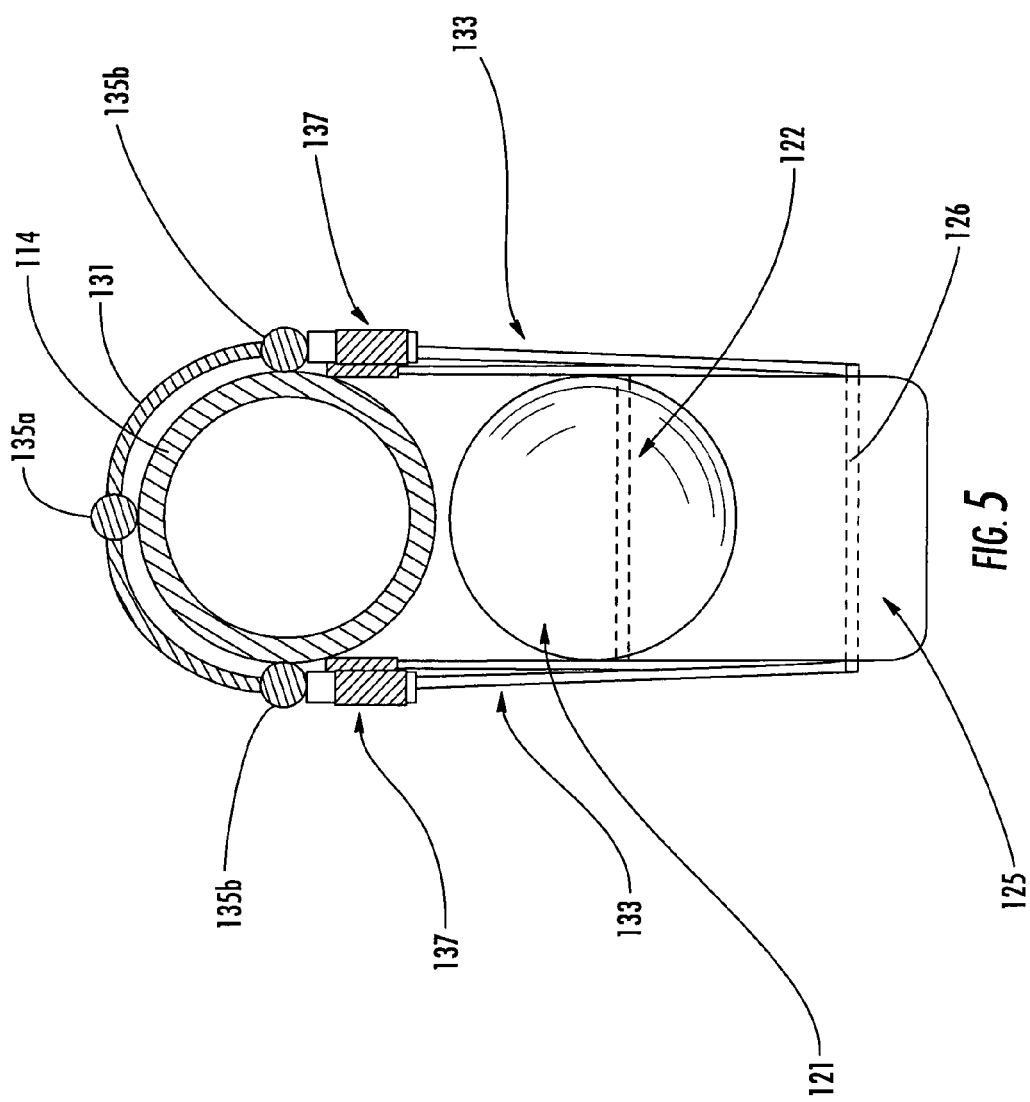
Figure 6:
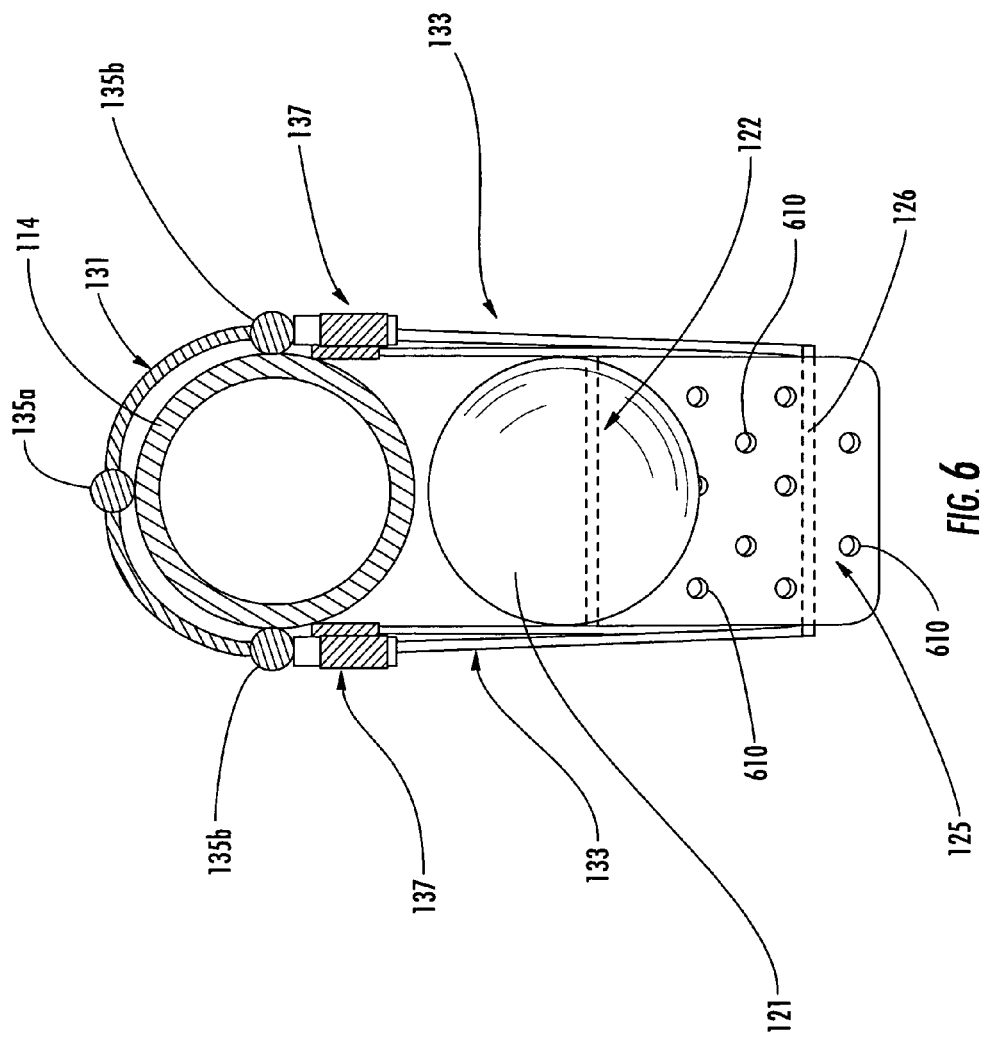

Having thus described the invention in general terms, reference will now be made to the accompanying drawings, which are not necessarily drawn to scale, and wherein:

FIG. 1 shows a probe and drogue in-flight refueling system according to one embodiment of the present invention including a damping device operably engaged with an elongate hose;

FIG. 2 shows a side view of the damping device according to one embodiment of the present invention;

FIG. 3 shows an elongate hose and attached drogue as part of a probe and drogue in-flight refueling system according to one embodiment of the present invention wherein the damping device is advanced along the elongate hose and consequently deployed so as to reverse an upward change in disposition of the elongate hose;

FIG. 4 shows a side view of the damping device according to one embodiment of the present invention wherein the damping device is deployed with respect to the elongate hose;

FIG. 5 shows a front view of the damping device according to one embodiment of the present invention wherein the damping device is deployed so as to exert a lifting force on the elongate hose; and FIG. 6 shows a front view of the damping device according to one embodiment of the present invention wherein the damping device is deployed so as to exert a drag force on the elongate hose.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 shows an in-flight refueling system according to one embodiment of the present invention including a tanker aircraft 110 and an elongate hose 114 extending therefrom. The elongate hose 114 comprises a first end (not shown) that is carried by the tanker aircraft 110 and may be operably engaged with a fuel reservoir located within a fuselage, wing structure, or other internal compartment within the tanker aircraft 110. In some embodiments, the first end of the elongate hose 114 may further be operably engaged with a refueling pod (not shown) that may be configured to be carried by a hardpoint located, for instance, on an outboard portion of a wing of the tanker aircraft 110. Furthermore, the elongate hose 114 may be configured to be capable of taken up from an extended position and rolled up on, for instance, a rotating drum assembly that may be disposed within a fuselage of the tanker aircraft 110 or within a refueling pod carried on a wing hardpoint of the tanker aircraft 110. Also shown in FIG. 1 is the second end of the elongate hose 114 extending aft and below the tanker aircraft 110 and operably engaged with a drogue 118. The elongate hose 114 and drogue 118 attached thereto are thus positioned so as to be capable of being engaged by, for instance, a refueling probe, carried by a second aircraft (not shown) which may approach the tanker aircraft 110 from the aft and below as part of an in-flight refueling operation.

FIG. 1 also shows a damping device 150 according to one embodiment of the present invention, operably engaged with the elongate hose 114. In the depicted embodiment, the damping device 150 is shown hanging from the elongate hose via a roller bearing device 130 although the damping device 150 may, in some embodiments, be capable of operably engaging the elongate hose 114 in other dispositions, such as, for instance being positioned above the elongate hose on the roller bearing device 130. The damping device 150 is configured to be capable of advancing along the elongate hose 114 in response to a change in disposition of the elongate hose 114. For instance, if the second end of the elongate hose (connected to the drogue 118) rises due to an oscillation in the elongate hose 114, the damping device 150 may, by the force of gravity, for instance, roll down the elongate hose 114 (via, for instance, the roller bearing device 130) towards to the tanker aircraft 110 (as described more fully below, and shown generally in FIG. 3). Additionally, the damping device 150 may be further configured to be deployed upon advancing along the elongate hose 114, such that the deployed damping device 150 may be configured to substantially reverse the change in disposition of the elongate hose 114. For example, as described in detail below, and as shown in FIGS. 3 and 4, the damping device may extend an airfoil device 125 outwardly from the elongate hose 114 in conjunction with its advance along the elongate hose so as to exert a lifting force or, alternatively, a drag force, on the elongate hose 114 so as to substantially reverse the change in disposition of the elongate hose 114 (such as, for instance, an undesirable oscillation in the elongate hose 114) as described in more detail below.

The damping device 150 is further configured to present a relatively compact cross section (see generally FIG. 5) with respect to the elongate hose 114 so as to allow the damping device to be taken up into a tunnel 111 defined, for instance, in the fuselage of the tanker aircraft 110 or in a refueling pod carried thereby. In conventional probe and drogue in-flight refueling systems, the drogue 118 and a proximally located buffer spring 117 are configured to be capable of being withdrawn within the tunnel 111 as the elongate hose 114 is taken up (onto a drum assembly, for instance) into the fuselage of the tanker aircraft 110 or into a refueling pod carried thereby. Thus, according to embodiments of the present invention, the damping device 150 is configured to be positioned in a neutral position proximal to the buffer spring 117 (as shown in FIG. 1). The neutral position may be defined as a position just proximal to the buffer spring 117 (near the drogue 118, as shown in FIG. 1). The damping device 150 may also be configured to have a small cross section (such as, for instance, a cross-section not substantially larger than the cross section of the elongate hose 114 (as shown in FIG. 5)) and relatively light weight so as to be capable of being drawn into the tunnel 111 defined in existing tanker aircraft 110 and/or refueling pods designed to be carried thereby. Thus, the damping device 150 may be stowed with the drogue 118 and the buffer spring 117 in the tunnel 111 when not extended and in use as part of an in-flight refueling operation. In addition, the cross-section of the damping device 150 is configured to produce a reduced amount of drag or other aerodynamic disturbance near the drogue 118 when the elongate hose 114 is extended (as shown in FIG. 1) until the damping device 150 is deployed with respect to the elongate hose 114 (by, for instance, its forward advance along the elongate hose 114). Upon deployment, the damping device 150 may extend outward an airfoil device 125 configured to exert a lift or a drag force to affect the aerodynamic forces exerted on the elongate hose 114.

FIG. 2 shows a detailed side view of the damping device 150 according to one embodiment of the present invention. The damping device 150 includes a roller bearing device 130 configured to be operably engaged with the elongate hose 114 and configured to be capable of advancing along the elongate hose 114 in response to a change in disposition of the elongate hose 114. The damping device also includes an airfoil device 120 operably engaged with the roller bearing device 130 and having a control surface 125 configured to outwardly extend with respect to the elongate hose 114 as the roller bearing device 130 advances along the elongate hose 114. As shown in FIG. 2, the roller bearing device 130 may include straps 131 configured to form a frame to substantially surround the elongate hose 114. The frame of the roller bearing device 130 may define cavities or apertures for receiving and retaining a plurality of roller bearings 135a, 135b. As shown in FIGS. 2 and 5, the roller bearings may include upper roller bearings 135a configured to roll along a top surface of the elongate hose 114 as well as side roller bearings 135b configured to roll along a lower side surface of the elongate hose 114. As shown in FIG. 2, the side roller bearings 135b and the straps 131 configured to retain the side roller bearings 135b may be positioned substantially below a centerline of the elongate hose 114 such that the frame defined by the straps 131 may substantially surround the elongate hose 114 such that the roller bearing device 130 may not be disengaged from the elongate hose 114 by, for instance, an oscillation in the elongate hose 114 or a sudden change in orientation of the elongate hose 114 with respect to the direction of the force of gravity. In addition, the frame of the roller bearing device 120 may comprise one or more frame hinges 136 configured to be capable of rotating in response to bends encountered in the elongate hose 114. Thus, according to some advantageous embodiments, the roller bearing device 120 may thus be capable of bending with the elongate hose 114 such that the damping device 150 may advance along the elongate hose 114 even if the elongate hose 114 is bent (as may be the case when the elongate hose 114 is experiencing an oscillation brought about by aerodynamic or other external forces).

As shown in FIG. 2, the damping device 150 also comprises an airfoil device 120 that may be configured to hang from the roller bearing device 130. The airfoil device 120 may comprise, for instance, a control surface 125, that may be configured to outwardly extend with respect to the elongate hose 114 as the roller bearing device 130 advances along the elongate hose 114 (by, for instance, the force of gravity as the elongate hose 114 rises as part of an oscillation experienced thereby (see generally, FIG. 3)). The airfoil device 120 may comprise a nose 121, a deployment hinge 122, body 123, control surface 125, and a deployment pin 126, such that the control surface 125 may rotate about the deployment hinge 122 and deploy outwardly with respect to the nose 121 and body 123 of the airfoil device 120. As shown in the side view of the damping device 150 in FIG. 2, the airfoil device 120 may hang below the elongate hose 114 from extensions of the frame of the roller bearing device 130 defined by the straps 131 that are configured to substantially surround the elongate hose 114. In addition, the side roller bearings 135b of the roller bearing device 130 (which are configured to roll along a side surface of the elongate hose 114) may be engaged with gearing devices 137 that may also be attached to the straps 131 that define the frame of the roller bearing device 130. The gearing devices 137 may be attached to the frame via pins, rivets, screws, or other rotatable connectors known to those skilled in the art. The gearing devices 137 may further be positioned so as to be capable of engaging the side roller bearings 135b so that as the side roller bearings 135b advance along the elongate hose 114, the side roller bearings 135b may engage the gearing devices 137 and cause them to rotate with respect to the frame defined by the straps 131 of the roller bearing device 130. As shown in FIG. 2 the gearing devices 137 may be operably engaged with control arms 132, 134 that extend therefrom and act to outwardly extend the control surface 125 of the airfoil device 120 as the roller bearing device 130 (and the side roller bearings 135b attached thereto) advances along the elongate hose 114.

In the embodiment shown in FIG. 2, the control arms 132, 134 comprise a forward control arm 132 defining a slot 133 therein, and an aft control arm 134 configured to extend from its respective gearing device 137 and into engagement with the slot 133 defined in the forward control arm 132. The forward control arm is thus configured to extend from its gearing device 137 and into engagement with the deployment pin 126 attached to an inner and aft side of the control surface 125 of the airfoil device 120. Thus, as the forward control arm 132 is rotated about its respective gearing device 137 it may exert an outward force (or in the embodiment shown, a downward force, via, for instance, a clockwise rotation imparted by the gearing device 137) on the control surface 125 such that the control surface 125 may rotate about the deployment hinge 122 that attaches the control surface 122 to the nose 121 of the airfoil device 120. In some embodiments, the aft control arm 134 may also extend from a gearing device 137 such that it engages the slot 133 defined in the forward control arm 132. The aft control arm 134 may be operably engaged with its gearing device 137, which may, in turn, be operably engaged with an aft side roller bearing 135b, so that as the side roller bearing 135b advances along the elongate hose 114, the gearing device 137 and the aft control arm 134 extending therefrom may rotate in a counterclockwise direction so as to exert an outward force on the slot 133 defined in the forward control arm 132 such that the forward control arm 132 may exert an outward force (or in the embodiment shown, a downward force) on the control surface 125 such that the control surface 125 may rotate about the deployment hinge 122 that attaches the control surface 122 to the nose 121 of the airfoil device 120. Thus, the forward and aft control arms 132, 134 may cooperate so as to outwardly extend the control surface 125 of the airfoil device 120 as the roller bearing device 130 advances along the elongate hose 114 (see FIG. 4, showing the airfoil device 120 in the outwardly extended position with respect to the elongate hose 114).

One skilled in the art will appreciate that the gearing device 137 from which the forward control arm 132 extends may be configured to impart a clockwise rotation, on the forward control arm 134 (about the gearing device 137) as the side roller bearings 135b advance along the elongate hose 114, in this instance, toward the tanker aircraft 110. Furthermore, an aft gearing device 137 (from which the aft control arm 132 may extend) may be configured so as to impart a counter-clockwise rotation, on the aft control arm 132 (about the gearing device 137) as the side roller bearings 135b advance along the elongate hose 114. Furthermore, the gearing devices 137 (both aft and forward) may be configured to impart a counter-clockwise and clockwise rotation on the forward and aft control arms 132, 134, respectively, as the side roller bearings 135b roll back to the neutral position (just forward of the buffer spring 117) (away from, in this instance, the tanker aircraft 110). Thus, the gearing devices 137 may be configured to actuate the forward and aft control arms 132, 134 such that they may inwardly retract the control surface 125 of the airfoil device 120 as it regresses towards the second end (including the buffer spring 117 and the drogue 118) of the elongate hose 114. In addition, according to some embodiments, only one gearing device 137 may be utilized, such that either of the forward control arm 132 or the aft control arm 134 is a "follower" arm configured to extend and retract with respect to the actuating action of the complementary control arm operably engaged with a gearing device 137. In addition, as will be appreciated by one skilled in the art, and as generally shown in FIGS. 5 and 6 a pair of forward and aft control arms 132, 134 may be engaged with the control surface 125 of the airfoil device 120 (via for instance, the deployment pin 126) and with gearing devices 137 of the roller bearing device 130 on both lateral sides (for instance, a left side, and a right side, with respect to a cross-section on the elongate hose 114) of the damping device 150.

The gearing device 137 may be composed of a number of materials that may be suitable for transferring the rotation of the side roller bearings 135b into torque force exerted so as to rotate the control arms 132, 134 that may outwardly extend the control surface 125 of the airfoil 120 with respect to the elongate hose 114. For example, in some instances, the side roller bearings may comprise toothed elements (such as gears) that may be rotated as the roller bearing device 130 advances along the elongate hose 114. Thus, the gearing device 137 may comprise a complementary gear configured to operably engage the side roller bearings 135b and translate the rotation thereof into a torque force on the control arms 132, 134 in order to rotate the control arms 132, 134 through a range of motion that may be defined, for instance, by the slot 133 defined in the forward control arm 132. The gearing devices 137 and/or the roller bearings 135a, 135b of the damping device 150 (and more particularly, the roller bearing device 130 thereof) may be composed of any material suitable for smoothly advancing along the elongate hose 114 and transmitting a rolling action into a torque force on the control arms 132, 134. For instance, either of the roller bearings 135a, 135b or the gearing devices 137 may be composed of lightweight low-friction polymers (such as PTFE) or a metallic material such as stainless steel. In addition, in some embodiments, the gearing devices 137 and roller bearings 135a, 135b may be composed of lightweight aviation-grade materials such as aluminum, aluminum alloys, and/or carbon fiber composite materials.

According to some embodiments, the gearing devices 137 may be configured to outwardly extend the control surface 125 of the airfoil device 120 (with respect to the elongate hose 114) in a linear relationship to the advance of the roller bearing device 130 along the elongate hose 114. For example, the gearing device 137 may be adapted to extend the control surface 125 (via the forward and aft control arms 132, 134) at a rate that is linearly related to the advance of the roller bearing device 130 along the elongate hose 114. For instance, in some embodiments, the gearing devices 137 may be configured to fully extend the control surface 125 after about fifteen feet of travel along the elongate hose 114. In addition, in some embodiments, the gearing devices 137 may also be configured to be capable of extending the control surface 125 of the airfoil device 120 in a non-linear relationship to the advance of the roller bearing device 130 along the elongate hose 114. For instance, in some embodiments, the control surface 125 may not begin substantially outwardly extending from the airfoil device 120 until the roller bearing device 130 has traveled about 10 feet along the elongate hose 114, at which time, a further advance of five feet may cause the gearing devices 137 of this non-linear embodiment to fully extend the control surface 125 during the course of about five feet of additional travel. In other embodiments, the total length of travel of the roller bearing device 130 and the linearity of the relationship between the distance of travel and extension of the control surface 125 may be adjusted so as to tailor the action of the damping device 150 to various types of oscillations and changes in disposition that may be observed during an in-flight refueling operation. One skilled in the art will appreciate that various types of gearing devices 137 may be used to tune and/or adjust the extension of the control surface 125 and the relation of the extension of the control surface 125 to the advance of the roller bearing device 130 along the elongate hose 114.

In some embodiments, the airfoil device 120 may operably engage the roller bearing device 130 in a variety of configurations so as to allow the control surface 125 of the airfoil 120 to deploy outwardly (with respect to the elongate hose 114) as the roller bearing device 130 advances and/or regresses along the length of the elongate hose 114. For instance, as shown in FIG. 2, the airfoil device 120 may hang below the elongate hose 114 from the roller bearing device 130. However, in other embodiments, the airfoil device 120 may ride above the elongate hose 114 or be operably engaged with a lateral side of the elongate hose 114 via the roller bearing device 130 so as to be capable of extending the control surface 125 with respect to the elongate hose 114 so as to exert a lifting and/or drag force on the elongate hose 114.

Upon outwardly extending with respect to the elongate hose, the control surface 125 of the airfoil 120 may act, for instance, as a flap device, so as to impart an increased lifting force on the elongate hose 114. For instance, as the control surface is lowered (see FIG. 4) the velocity of the airflow above the nose 121 and body 123 of the airfoil device 120 will be greater than the velocity of the airflow below the deployed control surface 125 of the airfoil device 120 such that a lifting force will be generated on the airfoil device 120 causing the airfoil device 120 (operably engaged with the elongate hose 114 via the roller bearing device 130) to impart a lifting force on the elongate hose 114. One skilled in the art will appreciate that such a lifting force may be generated by a velocity differential in the airflow below and above an airfoil (such as the airfoil device 120) due to a phenomenon known as the Bernoulli effect. In addition, in some embodiments (as shown generally in FIG. 6), the control surface 120 may be configured to define a plurality of apertures 610 configured to generate a drag force as air is allowed to flow through the apertures 610 defined in the control surface 125. In this instance, instead of acting as a flap device, the deployed control surface 125 will act as a speed brake imparting a significant drag force on the airfoil 120 as it is deployed. In this case, the elongate hose 114 (operably engaged with the airfoil device 120 via the roller bearing device 130) may be pulled taut by the drag force imparted by the drag forces produced by the deployed control surface 125. Both increased lift (shown in FIG. 4) and increased drag (shown in FIG. 6) add substantial external forces to the elongate hose 114 so as to prevent the elongate hose 114 from dangerously oscillating with respect to the tanker aircraft 110 at, for instance, a resonance frequency. One skilled in the art will appreciate that the addition of additional forces (either lifting force or drag forces) will act to substantially de-tune the elongate hose 114 from oscillating at a resonance frequency and may act to dampen any oscillation experienced by the elongate hose 114 during the deployment of the elongate hose 114 and drogue 118 attached thereto during an in-flight refueling operation.

As shown in FIG. 3, the damping device 150 may be configured to be capable of advancing from the drogue 118 and buffer spring 117 located at the second end of the elongate hose 114 toward the first end (carried by the tanker aircraft 110 (see FIG. 1)) of the elongate hose 114 in response to a change in disposition (such as an upward motion) of the second end 114. In addition, as described above, the control surface 125 of the damping device 150 may be further configured to be deployed as the damping device 150 advances toward the first end of the elongate hose 114. As such, the deployed damping device 150 may thereby be configured to substantially reverse the change in disposition of the second end of the elongate hose 114 by exerting a lifting force (according to the embodiment shown in FIGS. 4 and 5) or a drag force (according to the embodiment shown in FIG. 6). In the embodiment shown in FIG. 3, the damping device 150 may be positioned initially adjacent to the buffer spring 117 (as shown in FIGS. 1 and 2) until such time as the drogue 118 (and attached second end of the elongate hose 114) may move in an upward direction (as shown in FIG. 3) in response to an external force or an oscillation in the elongate hose 114. As both the second end and the drogue 118 rise as part of the oscillation, the damping device 150 may advance along the elongate hose 114 by the force of gravity. In some embodiments, as described above, the damping device 150 may comprise a roller bearing device 130 comprising a plurality of roller bearings 135a, 135b configured to roll along the surface of the elongate hose 114. In addition, according to some embodiments, the damping device 150 may comprise an airfoil device 120 having a nose 121 that may be weighted so as to urge the forward advance of the damping device 150 in response to a rise in the second end of the elongate hose 114. In addition, according to the embodiment described and shown in FIG. 3, the damping device 150 may be configured to remain in place adjacent to the buffer spring 117 so long as the second end of the elongate hose 114 does not rise to a position above the forward portions of the elongate hose 114 (due to, for instance, an oscillation or other change in disposition of the elongate hose 114). Thus, the damping device 150, according to advantageous embodiments of the present invention, may be a substantially passive device configured only to advance and/or extend a control surface 125 in response to an upward change in disposition of the elongate hose 114.

FIGS. 5 and 6 show a front view of the damping device 150 according to one embodiment of the present invention wherein the control surface 125 is outwardly deployed with respect to the airfoil device 120 (and the elongate hose 114). As shown, the airfoil device 120 (and the nose 121 of the airfoil device 120) may be configured to be substantially equal in lateral width to the cross section of the elongate hose 114. In such embodiments, the damping device 150 may be compact and light in weight and may be capable of being stowed within the tunnel 111 defined in the tanker aircraft 110 (and/or a refueling pod carried thereby) along with the buffer spring 117 and drogue 118. However, in some embodiments, the airfoil may be widened so as to provide a more wing-like front profile so as to be configured to be capable of providing a larger lift and/or drag force as the control surface 125 is outwardly deployed with respect to the elongate hose 114.

In addition, the materials of the components of the damping device 150 provided according to the various embodiments of the present invention may be varied in response to the needs of a particular embodiment. For instance, in some embodiments (wherein, for instance, the take-up mechanism (or roller drum) of the tanker aircraft 110 is used to roll up the elongate hose 114), it may be advantageous to reduce the weight of the damping device 150 such that the damping device 150 does not substantially increase the load carried by the elongate hose 114 take-up mechanism (such as a roller drum). Thus, the larger structural components of the damping device 150, such as, for instance, the airfoil device 120 and the straps 131 defining the frame of the roller bearing device 130 may be composed of lightweight metallic materials, such as aluminum or aluminum alloys. In addition, these components may be composed of carbon fiber composite materials, molded polymers, or other materials suitable for withstanding the aerodynamic forces that are exerted on the damping device 150 as it is operably engaged with the elongate hose 114 trailing behind a tanker aircraft 110 at speeds of between about 150 and 400 knots. In addition, the connectors and smaller hardware of the damping device 400 such as, for instance, the deployment hinge 122, the control arms 132, 134, the deployment pin 126, roller bearings 135a, 135b, and the gearing devices 137 may also be composed of metallic materials, metallic alloys, polymers, carbon composite materials, or other materials suitable for performing in the high-speed and often turbulent airflow environment experienced by the damping device 150. It may be advantageous, in some embodiments, to form some connectors used in the damping device 150 (such as the deployment hinge and pin 122, 126, roller bearings 135a, 135b, and control arms 132, 134) out of lightweight low-friction materials, such as, for instance PTFE polymers, so as to avoid the need to lubricate these components to ensure that they will operate as described above.

Referring again to FIGS. 1 and 2, a method for facilitating the stabilization of an elongate hose 114 having a first end carried by a tanker aircraft 110 and an opposing second end (operably engaged with a drogue 118) configured to extend from the tanker aircraft 110 is described. The method comprises the steps of advancing a damping device 150 along the elongate hose 150 in response to a change in disposition (such as an upward motion as shown in FIG. 3) of the elongate hose 114 and deploying the damping device 150 upon advancing along the elongate hose 114 so as to substantially reverse the change in disposition of the elongate hose 114 (and/or dampen an oscillation of the elongate hose 114). According to some embodiments, the advancing step may further comprise advancing the damping device 150 from the second end of the elongate hose 114 (nearest the drogue 118) toward the first end of the elongate hose 114 (nearest the tanker aircraft 110) in response to a change in disposition of the second end of the elongate hose 114. Furthermore, the deploying step may further comprise deploying the damping device 150 upon advancing toward the first end of the elongate hose 114 so as to substantially reverse the change in disposition (such as an upward motion) of the second end of the elongate hose 114.

Also, according to some embodiments, the deploying step of the method of the present invention may further comprise outwardly extending the damping device 150 with respect to the elongate hose 114 as the damping device 150 advances along the elongate hose 114. More particularly, and as described above with respect to the in-flight refueling system and damping device 150 of the present invention, the deploying step may further comprise outwardly extending a control surface 125 of an airfoil 120 carried by a roller bearing device 130 configured to substantially surround the elongate hose 114 and advance along the elongate hose 114 in response to an upward motion in the second end of the elongate hose 114. Furthermore, according to some embodiments, the deploying step of the method of the present invention may further comprise exerting a lifting force (via the outward extension of the control surface 125) on the elongate hose 114 and/or exerting a drag force (via the outward extension of a "speed brake" embodiment (see FIG. 6) of the control surface 125) on the elongate hose 114. Furthermore, the method of the present invention may also comprise the step of synchronizing the advancing and deploying steps such that the damping device 150 (or the control surface 125) is deployed in a linear relationship to the advance of the damping device 150 (or more particularly, the roller bearing device 130) along the elongate hose 114. As described in more detail above, the synchronizing step may be achieved by operably engaging the plurality of roller bearings 135a, 135b with at least one gearing device 137 that may be configured to extend the control arms 132, 134 of the damping device 150 as the roller bearing device 130 advances along the elongate hose 130. Thus, the control arms 132, 134 (being attached via a deploying pin 126 to the control surface 125) may be configured to outwardly extend the control surface 125 with respect to the elongate hose 114 in a linear relationship to the advance of the damping device 150 along the elongate hose 114.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims.

Although specific terms are employed herein, they are used in a generic and descriptive sense only and not for purposes of limitation.

What is claimed is:

1. An in-flight refueling system comprising:
   a tanker aircraft;
   an elongate hose having a first end carried by the tanker aircraft and an opposing second end configured to extend from the tanker aircraft; and
   a damping device operably engaged with the elongate hose and configured to be capable of advancing along the elongate hose in response to a change in disposition of the elongate hose, the damping device being further configured to be deployed upon advancing along the elongate hose, the deployed damping device thereby being configured to substantially reverse the change in disposition of the elongate hose.

2. An in-flight refueling system according to claim 1, wherein the damping device is further configured to be capable of advancing from the second end toward the first end of the elongate hose in response to a change in disposition of the second end, the damping device being further configured to be deployed upon advancing toward the first end, the deployed damping device thereby being configured to substantially reverse the change in disposition of the second end.

3. An in-flight refueling system according to claim 1, wherein the deployed damping device is further configured to exert a lifting force on the elongate hose.

4. An in-flight refueling system according to claim 1, wherein the deployed damping device is further configured to exert a drag force on the elongate hose.

5. An in-flight refueling system according to claim 1, wherein the damping device comprises:
   a roller bearing device operably engaged with the elongate hose and configured to be capable of advancing along the elongate hose in response to a change in disposition of the elongate hose; and
   an airfoil device operably engaged with the roller bearing device and configured to outwardly extend with respect to the elongate hose as the roller bearing device advances along the elongate hose.

6. An in-flight refueling system according to claim 5, wherein the roller bearing is further configured to be capable of advancing from the second end toward the first end of the elongate hose in response to a change in disposition of the second end and wherein the airfoil device is further configured to outwardly extend with respect to the elongate hose as the roller bearing device advances toward the first end.

7. An in-flight refueling system according to claim 5, wherein the damping device further comprises a gearing device disposed between the roller bearing device and the airfoil device configured to outwardly extend the airfoil device with respect to the elongate hose as the roller bearing device advances along the elongate hose.

8. An in-flight refueling system according to claim 5, wherein the airfoil device defines a plurality of apertures such that the airfoil device is further configured to produce a drag force as the airfoil device is outwardly extended with respect to the elongate hose.

9. An in-flight refueling system adapted to be carried by a tanker aircraft, comprising:
   an elongate hose having a first end carried by the tanker aircraft and an opposing second end configured to extend from the tanker aircraft; and
   a damping device operably engaged with the elongate hose and configured to be capable of advancing along the elongate hose in response to a change in disposition of the elongate hose, the damping device being further configured to be deployed upon advancing along the elongate hose, the deployed damping device thereby being configured to substantially reverse the change in disposition of the elongate hose.

10. An in-flight refueling system according to claim 9 wherein the damping device is further configured to be capable of advancing from the second end toward the first end of the elongate hose in response to a change in disposition of the second end, the damping device being further configured to be deployed upon advancing toward the first end, the deployed damping device thereby being configured to substantially reverse the change in disposition of the second end.

11. An in-flight refueling system according to claim 9, wherein the deployed damping device is further configured to exert a lifting force on the elongate hose.

12. An in-flight refueling system according to claim 9, wherein the deployed damping device is further configured to exert a drag force on the elongate hose.

13. An in-flight refueling system according to claim 9, wherein the damping device comprises:
   a roller bearing device operably engaged with the elongate hose and configured to be capable of advancing along the elongate hose in response to a change in disposition of the elongate hose; and
   an airfoil device operably engaged with the roller bearing device and configured to be outwardly extended with respect to the elongate hose as the roller bearing device advances along the elongate hose.

14. An in-flight refueling system according to claim 13, wherein the roller bearing is further configured to be capable of advancing from the second end toward the first end of the elongate hose in response to a change in disposition of the second end and wherein the airfoil device is further configured to outwardly extend with respect to the elongate hose as the roller bearing device advances toward the first end.

15. An in-flight refueling system according to claim 13, wherein the damping device further comprises a gearing device disposed between the roller bearing device and the airfoil device configured to outwardly extend the airfoil device with respect to the elongate hose as the roller bearing device advances along the elongate hose.

16. An in-flight refueling system according to claim 13, wherein the airfoil device defines a plurality of apertures such that the airfoil device is further configured to produce a drag force as the airfoil device is outwardly extended with respect to the elongate hose.

* * * * *